(12) United States Patent
Lai

(10) Patent No.: US 8,963,061 B2
(45) Date of Patent: Feb. 24, 2015

(54) MICROWAVE HEATING CONSTRUCT WITH VENTING FEATURES

(75) Inventor: Laurence M. C. Lai, Mississauga (CA)

(73) Assignee: Graphic Packaging International, Inc., Atlanta, GA (US)

( * ) Notice: Subject to any disclaimer, the term of this patent is extended or adjusted under 35 U.S.C. 154(b) by 582 days.

(21) Appl. No.: 12/952,553

(22) Filed: Nov. 23, 2010

(65) Prior Publication Data

US 2011/0127257 A1    Jun. 2, 2011

Related U.S. Application Data

(60) Provisional application No. 61/283,151, filed on Nov. 30, 2009.

(51) Int. Cl.
*H05B 6/80* (2006.01)
*B65D 81/34* (2006.01)
*H05B 6/64* (2006.01)

(52) U.S. Cl.
CPC ............ *H05B 6/6408* (2013.01); *H05B 6/6494* (2013.01)
USPC ............ 219/730; 219/728; 426/107; 426/234

(58) Field of Classification Search
CPC .......................... H05B 6/6494; H05B 6/6408
USPC .......... 219/728–730, 725, 759; 426/107, 234, 426/241, 243; 99/DIG. 14
See application file for complete search history.

(56) References Cited

U.S. PATENT DOCUMENTS

| | | |
|---|---|---|
| 4,283,427 A | 8/1981 | Winters et al. |
| 4,943,456 A | 7/1990 | Pollart et al. |
| 5,002,826 A | 3/1991 | Pollart et al. |
| 5,118,747 A | 6/1992 | Pollart et al. |
| 5,247,149 A | 9/1993 | Peleg |
| 5,410,135 A | 4/1995 | Pollart et al. |
| 5,412,187 A | 5/1995 | Walters et al. |
| 5,530,231 A | 6/1996 | Walters et al. |
| 6,158,589 A | 12/2000 | Smith |
| 6,204,492 B1 | 3/2001 | Zeng et al. |
| 6,251,451 B1 * | 6/2001 | Zeng .............................. 426/107 |
| 6,433,322 B2 | 8/2002 | Zeng et al. |
| 6,455,827 B2 | 9/2002 | Zeng |
| 6,552,315 B2 | 4/2003 | Zeng et al. |
| 6,677,563 B2 | 1/2004 | Lai |

(Continued)

FOREIGN PATENT DOCUMENTS

| | | |
|---|---|---|
| GB | 2 346 795 A | 8/2000 |
| JP | S64 20331 U | 2/1989 |

(Continued)

OTHER PUBLICATIONS

International Search Report and Written Opinion dated Aug. 31, 2011 for PCT/US2010/057742.

(Continued)

*Primary Examiner* — Quang Van
(74) *Attorney, Agent, or Firm* — Womble Carlyle Sandridge & Rice, LLP

(57) ABSTRACT

A microwave heating construct has a platform including microwave energy interactive material and a plurality of venting features. The venting features include a plurality of tabs that are urged out of the plane of the platform to define an aperture. The tabs are disposed beneath the platform to define a void in communication with the aperture.

25 Claims, 2 Drawing Sheets

(56) References Cited

U.S. PATENT DOCUMENTS

| | | | |
|---|---|---|---|
| 7,514,659 B2 | 4/2009 | Lafferty | |
| 2006/0011620 A1 | 1/2006 | Tsontzidis et al. | |
| 2007/0221666 A1 | 9/2007 | Keefe et al. | |
| 2007/0228036 A1 | 10/2007 | Noyelle et al. | |
| 2008/0035634 A1 | 2/2008 | Zeng et al. | |
| 2009/0120929 A1 | 5/2009 | Lafferty | |
| 2009/0302032 A1 | 12/2009 | Middleton | |
| 2010/0213192 A1 | 8/2010 | Middleton et al. | |

FOREIGN PATENT DOCUMENTS

| | | |
|---|---|---|
| JP | 2003-165582 | 6/2003 |
| JP | 2009-532088 | 9/2009 |
| WO | WO 2006/076501 A1 | 7/2006 |
| WO | WO 2007/123611 A1 | 11/2007 |
| WO | WO 2007/127371 A2 | 11/2007 |
| WO | WO 2009/152120 A2 | 12/2009 |

OTHER PUBLICATIONS

Notification of Reason for Refusal for JP 2012-542091 dated Oct. 31, 2013.

Supplementary European Search Report for EP 10 83 3837 dated Oct. 27, 2014.

* cited by examiner

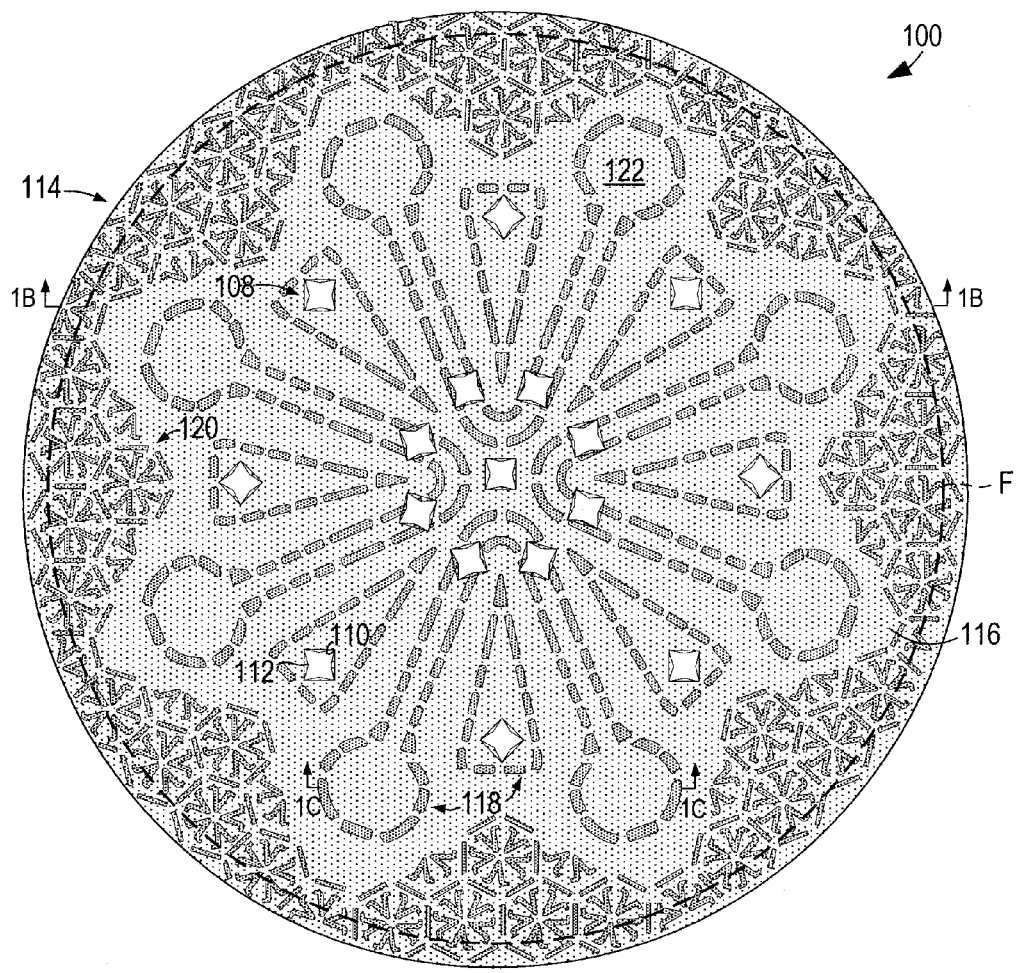
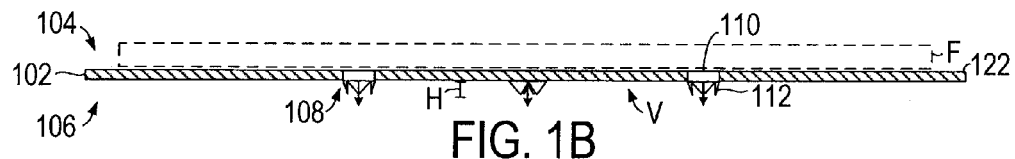
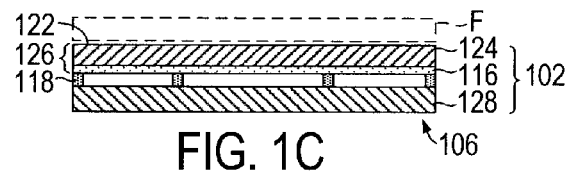
FIG. 1A
FIG. 1B
FIG. 1C

US 8,963,061 B2

MICROWAVE HEATING CONSTRUCT WITH VENTING FEATURES

CROSS-REFERENCE TO RELATED APPLICATION

This application claims the benefit of U.S. Provisional Application No. 61/283,151, filed Nov. 30, 2009, which is incorporated by reference herein in its entirety.

TECHNICAL FIELD

This disclosure relates to constructs for heating or cooking a microwavable food item. In particular, this disclosure relates to various constructs for heating or cooking a food item in a microwave oven, where the food item has a surface that is desirably browned and/or crisped.

BACKGROUND

Microwave ovens provide a convenient means for heating a variety of food items, including sandwiches and other bread and/or dough-based products such as pizzas and pies. However, microwave ovens tend to cook such items unevenly and are unable to achieve the desired balance of thorough heating and a browned, crisp crust. As such, there is a continuing need for improved materials, packages, and constructs that provide the desired degree of heating, browning, and/or crisping of various food items in a microwave oven.

SUMMARY

This disclosure is directed to a construct or apparatus for heating, browning, and/or crisping a food item in a microwave oven, a blank for forming the construct, and a method of using the construct. The construct includes a substantially planar platform for receiving the food item, and a plurality of venting features that elevate at least a portion of the platform from the surface or floor of the microwave oven. The venting features allow for moisture to be carried away from the food item, for example, for enhancing the browning and/or crisping of the food item.

Additionally, if desired, the construct may include microwave energy interactive material configured as one or more microwave energy interactive elements for altering the effect of microwave energy on the food item. As one example, the construct may include a susceptor for browning and/or crisping the food item. As another example, the construct may include one or more microwave energy directing elements for directing microwave energy to certain parts of the food item.

The construct may be used to prepare various food items in a microwave oven, for example, a pizza, savory or sweet pastries, breaded food items, or any other tubular food item that desirably is heated, browned, and/or crisped.

The construct may generally be formed from a disposable material, for example, paperboard. The construct also may be used in a conventional oven.

Additional aspects, features, and advantages of the present invention will become apparent from the following description and accompanying figures.

BRIEF DESCRIPTION OF THE DRAWINGS

The description refers to the accompanying schematic drawings in which like reference characters refer to like parts throughout the several views, and in which:

FIG. 1A is a schematic top plan view of one side of an exemplary microwave heating construct, including a plurality of venting features; and FIG. 1B is a schematic cross-sectional view of a portion of the construct of FIG. 1A, taken along a line 1B-1B;

FIG. 1C is a schematic cross-sectional view of a portion of the construct of FIG. 1A, taken along a line 1C-1C, and showing only the cross-section;

DESCRIPTION

Figure 1D:
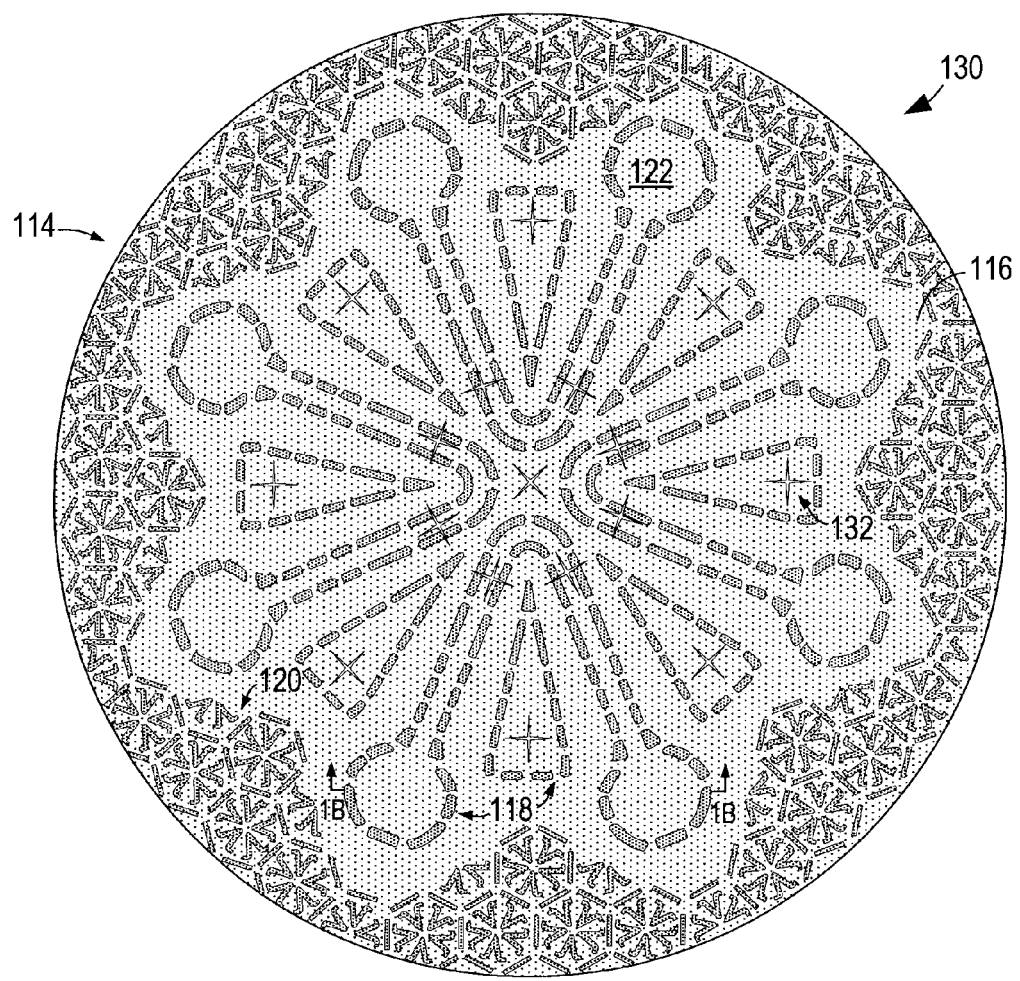
FIG. 1D is a schematic top plan view of one side of an exemplary blank for forming the microwave heating construct of FIG. 1A.

Various aspects of the invention may be understood further by referring to the figures. For purposes of simplicity, like numerals may be used to describe like features. It will be understood that where a plurality of similar features are depicted, not all of such features necessarily are labeled on each figure. It also will be understood that the various components used to form the constructs may be interchanged. Thus, while only certain combinations are illustrated herein, numerous other combinations and configurations are contemplated hereby.

FIG. 1A schematically depicts a top plan view of an exemplary microwave heating construct 100. The construct 100 generally includes a substantially planar, dimensionally stable platform 102 having a pair of opposed sides including a first side 104 for supporting a food item, and a second side 106 (FIG. 1B) opposite the first side. In this example, the construct 100 is substantially circular in shape, suitable for heating a substantially circular food item (not shown), for example, a pizza. However, differently shaped constructs and food items may be used.

Still viewing FIG. 1A, the construct 100 includes a plurality of venting features 108. Each venting feature 108 comprises an aperture 110 and at least one tab 112, and in some examples, a plurality of tabs 112 extending downwardly from the platform 102, as shown in FIG. 1B. The tabs 112 are disposed beneath the platform 102 (i.e., adjacent to the second side 106 of the platform 102) to define at least one void V beneath the platform 102 when the construct 100 is positioned on a surface. The tabs 112 are generally contiguous with and generally circumscribe the aperture 110, so that the area around the aperture may be elevated from the surface on which the construct 100 is seated, with the void V being in communication with the aperture 110.

In this example, the apertures 110 are arranged so that a first aperture is substantially centered within the construct 100, a first plurality of apertures surrounds the central aperture, and a second plurality of apertures surrounds the first plurality of apertures. The apertures 110 are generally distal (i.e., spaced) from a periphery or peripheral edge 114 of the construct 100. Further, in this example, the apertures 110 are generally square in shape. However, the apertures may have any suitable number, shape, and configuration as needed, as will be discussed further below.

If desired, the construct 100 may include microwave energy interactive material configured to define one or more microwave energy interactive elements for altering the effect of microwave energy on a food item. For example, in the construct 100 illustrated schematically in FIG. 1A, the microwave energy interactive material is configured as a susceptor 116 (shown schematically with light stippling) and a plurality of microwave energy distributing elements 118, 120 (shown schematically with heavy stippling).

The susceptor 116 may generally comprise a thin layer of microwave energy interactive material (generally less than about 100 angstroms in thickness, for example, from about 60 to about 100 angstroms in thickness, and having an optical density of from about 0.15 to about 0.35, for example, about 0.21 to about 0.28) that tends to absorb at least a portion of impinging microwave energy and convert it to thermal energy (i.e., heat) at the interface with the food item. Thus, the susceptor 116 may be generally positioned within the construct to be proximate to an uppermost, food-contacting surface 122 of the construct 100 for enhancing the heating, browning, and/or crisping of the bottom surface of the food item (not shown).

As shown in FIG. 1C, the susceptor 116 may be supported on a microwave energy transparent substrate 124, for example, a polymer film, thereby collectively forming a "susceptor film" 126. The outermost surface of the polymer film 124 may define at least a portion of the food-contacting surface 122 on the first side 104 of the construct 100.

The microwave energy distributing elements 118, 120 may generally comprise a plurality of metallic segments (e.g., metallic foil or high optical density material) configured to direct microwave energy to one or more portions of an adjacent food item, typically so that the food item is heated more evenly. In this example, microwave energy distributing elements 118 may be configured to direct microwave energy towards the center of the construct to improve bulk heating of the food item, while microwave energy distributing elements 120 may be configured to distribute microwave energy along the peripheral margin (i.e., the area proximate and adjacent to the periphery 114 of the construct 100.

The susceptor film 116 and microwave energy distributing elements 118, 120 be supported on and/or joined to a paperboard base layer 128 (or other suitable base layer) using any suitable technique, for example, using a layer of adhesive (not shown). It will be noted that in this example, the microwave energy distributing elements 118, 120 are disposed between the susceptor 116 and the paperboard base layer 128. However, other configurations are contemplated. Further, it will be appreciated that in other embodiments, one or more of such elements 116, 118, 120 may be omitted, reconfigured, and/or replaced with other microwave energy interactive elements, as will be discussed further below. Countless possibilities are contemplated.

To use the microwave heating construct 100 according to one exemplary method, a food item F (shown schematically with dashed lines in FIGS. 1A-1C) may be placed on the food-contacting surface 122 of the construct 100 and heated in a microwave oven according to the package directions. After sufficient exposure to microwave energy, the susceptor 116 converts at least a portion of the impinging microwave energy into thermal energy, which then can be transferred to the bottom surface of the food item F to enhance browning and/or crisping. The microwave energy directing elements 118, 120 may assist with distributing the microwave energy along the construct 100 to provide more even heating of the food item F.

As the food item F heats, water vapor and other gases trapped beneath the food item may be carried away from the food item through the apertures 110 in communication with the at least one void V beneath the construct 100 (created by the tabs 112 extending downwardly), as indicated schematically with arrows in FIG. 1B. As a result, the food item F may be browned and/or crisped more effectively. Further, since the various elevating tabs 112 cooperate to maintain the food item F in a raised position in the microwave oven, the air in the void V between the construct 100 and the microwave oven may provide an insulating effect that reduces the loss of heat from the susceptor 116 to the heating environment. Thus, more of the heat generated by the susceptor 116 may be available for transfer to the food item F.

It will be appreciated that the venting features 108 may be configured and dimensioned as needed to provide the desired degree of transport of moisture away from the food item. For example, smaller apertures 110 (defined by smaller tabs 112) and a smaller void V or airspace beneath the construct 100 may be used where little venting and/or thermal insulation is needed. Conversely, where additional insulation and/or venting is needed, larger apertures 110 (defined by larger tabs 112) and a greater void V or airspace beneath the construct 100 may be provided.

In each of various examples, the apertures 110 may generally have a major linear dimension (e.g., corner to corner of a square aperture; diameter of a circular shaped aperture, and so on) of less than about 0.8 in., for example, less than about 0.7 in, less than about 0.6 in., less than about 0.5 in., less than about 0.4 in., less than about 0.3 in., or less than about 0.2 in. In the absence of a load, the height H of the void beneath the platform may generally be less than about 0.4 in., less than about 0.3 in., or less than about 0.2 in. It will be appreciated that the height H of the void V may decrease when the food item F is placed on the construct 100. Likewise, some of the void V may become obstructed and/or fully closed. However, even in the presence of a load (e.g., the food item), the presence of the downwardly pressed (e.g., compressed and/or crushed) create a gap between the second side 106 of the construct 100 and the surface on which it is seated.

FIG. 1D schematically illustrates an exemplary blank 130 for forming the microwave heating apparatus or construct 100 of FIGS. 1A-1C. In the illustrated embodiment, the blank 130 is substantially circular in shape. However, differently shaped blanks may be used. The blank 130 has a first side 104 and a second side 106 (FIG. 1B) opposite the first side 104.

As shown in FIG. 1D, the blank 130 includes a plurality of cuts (e.g., slits or cutouts) 132 extending through the thickness of the blank 130. In this example, the cuts 132 are arranged so that a first cut is substantially centered on the blank 130, a first plurality of cuts surrounds the central cut, and a second plurality of cuts surrounds the first plurality of cuts. The cuts 132 are distal (i.e., spaced) from a periphery or peripheral edge 114 of the blank 132. Further, in this example, the first plurality of cuts and the second plurality of cuts each include eight cuts. However, other numbers and arrangements of cuts may be used, for example, to define a fewer or greater number of tabs 112.

In the illustrated embodiment, each cut 132 is generally cross-shaped and generally includes a first substantially linear cut 134 and a second substantially linear cut 136. The first cut 134 and second cut 136 have a substantially equal length and intersect substantially at their midpoints. In this example, the cuts 134, 136 are arranged so that cut 134 is substantially perpendicular to cut 136. As a result, the length of each cut 134, 136 is divided in half by the other cut, such that each cross-shaped cut 132 includes four smaller cuts or half-cuts 134a, 134b, 136a, 136b extending inwardly towards and intersecting at a center point.

Each cut 134, 136 of the pair of cuts may independently have any suitable dimensions. In one example, each cut 134, 136 has a length that is less than about 0.6 in., for example, less than about 0.5 in., less than about 0.4 in., less than about 0.3 in., or less than about 0.2 in., such that the length of each half-cut 134a, 134b, 136a, 136b has a length that is less than about 0.3 in., less than about 0.25 in., less than about 0.2 in., or less than about 0.1 in. However, other dimensions and ranges thereof for each cut are contemplated.

Figure 1E:
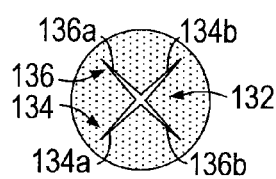
FIG. 1E is a schematic top plan view of one cross-shaped cut of the blank of FIG. 1D.
Figure 1F:
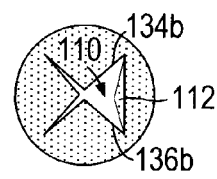
FIG. 1F is a schematic top plan view of the cross-shaped cut of FIG. 1E, with one tab activated.
Figure 1G:
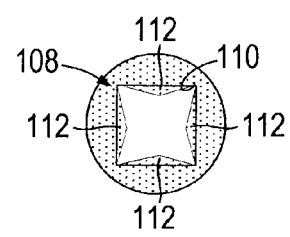
FIG. 1G is a schematic top plan view of the cross-shaped cut of FIG. 1E, with each tab activated.

Turning to FIGS. 1E-1G, each adjacent pair of half-cuts (or simply "cuts") (e.g., cuts 134b, 136b) defines a somewhat triangular shaped tab 112 (FIG. 1F). Each of such tabs 112 may be moved or urged out of the plane of the remainder of the blank 130, for example, towards the second side 106 of the blank 130. If desired, score lines or other lines of weakness (not shown) may be provided between the endpoints of adjacent cuts to facilitate the activation of the tabs (i.e., to facilitate the movement of the tabs 112 out of the plane of the remainder of the blank 130). As shown in FIG. 1F, when each tab 112 is urged downwardly, a somewhat triangular opening 138 is created. Thus, each group of four tabs 112 defined by each pair of cuts 134, 136 defines a somewhat square shaped opening 110 (FIG. 1G).

FIG. 1A schematically illustrates the blank 130 formed into the construct 100 with all of the tabs 112 in an activated configuration and disposed beneath the platform 102, such that the construct 100 includes the plurality of somewhat square-shaped apertures or openings 110. Each aperture 110 generally has an area that is approximately equal to the collective area of the contiguous tabs 112 (i.e., the area generally defined by the major linear dimensions of the respective cut 132).

As discussed above, when the construct 100 is placed on a surface (e.g., the turntable or bottom of a microwave oven), the tabs 112 on the second side 106 of the construct 100 elevate the food-contacting surface 122 of the construct 100, thereby creating a void V between the second side 106 of the construct 100 and the surface on which the construct 100 is seated (FIG. 1B). In this configuration, the apertures 110 and tabs 112 collectively define venting features 108 that are operative for carrying moisture away from the food item.

It will be appreciated that the cross-shaped cuts 132 (and/or individual cuts 134, 136, 134a, 134b, 136a, 136b), and therefore tabs 112 and apertures 110, may be sized and configured to provide the desired degree of insulation and/or venting needed for a particular food item. For example, where less venting and/or insulation is needed, the cuts 132 may be configured to provide smaller tabs 112, and therefore, smaller openings 110 and a smaller void V beneath the platform 102. Conversely, where greater venting and/or insulation is needed, the cuts 132 may be configured to provide larger tabs 112, and therefore, larger openings 110 and a larger void V beneath the platform 102. It is also contemplated that a combination of differently shaped and/or dimensioned cuts 132 (and therefore apertures 110) may be used.

Further, although cross-shaped cuts 132 are shown in the illustrated embodiment, it will be appreciated that countless other cut shapes, for example, star shapes, pinwheel shapes, and so on, or any combination of shapes (and/or sizes) may be used. It will also be appreciated that each of such shapes may include any number of individual cuts within each shape. It will also be appreciated that although the cuts may be described as comprising a plurality of smaller cuts, the cut may be formed in the blank and/or construct as a single cut, multiple cuts, or in any suitable manner.

Countless other microwave heating constructs are contemplated by the disclosure. The constructs may have any suitable shape, for example, circular, oval, triangular, square, rectangular, pentagonal, hexagonal, heptagonal, octagonal, or any other regular or irregular shape. The shape of the construct may be determined by the shape of the food product, and it will be understood that different shapes are contemplated for different food products, for example, sandwiches, pizzas, pastries, doughs, and so forth. Further, it will be appreciated that the venting features may have any shape, size, and/or configuration as needed or desired, as stated above. For example, the apertures and/or tabs may be oval, rectangular, square, diamond-shaped, trapezoidal, polygonal, or any other regular or irregular shape.

Any of such structures or constructs may be formed from various materials, provided that the materials are substantially resistant to softening, scorching, combusting, or degrading at typical microwave oven heating temperatures, for example, at from about 250° F. to about 425° F. The materials may include microwave energy interactive materials, for example, those used to form susceptors and other microwave energy interactive elements, and microwave energy transparent or inactive materials, for example, those used to form the remainder of the construct.

In the case of a susceptor, the microwave energy interactive material may comprise an electroconductive or semiconductive material, for example, a vacuum deposited metal or metal alloy, or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In other embodiments, the microwave energy interactive material may be carbon-based, for example, as disclosed in U.S. Pat. Nos. 4,943,456, 5,002,826, 5,118,747, and 5,410,135.

In still other embodiments, the microwave energy interactive material may interact with the magnetic portion of the electromagnetic energy in the microwave oven. Correctly chosen materials of this type can self-limit based on the loss of interaction when the Curie temperature of the material is reached. An example of such an interactive coating is described in U.S. Pat. No. 4,283,427.

As stated above, the microwave energy interactive elements (e.g., susceptor 116) may be supported on a microwave inactive or transparent substrate (e.g., polymer film 124) for ease of handling and/or to prevent contact between the microwave energy interactive material and the food item. The outermost surface of the polymer film may define at least a portion of the food-contacting surface of the package (e.g., surface 122). Examples of polymer films that may be suitable include, but are not limited to, polyolefins, polyesters, polyamides, polyimides, polysulfones, polyether ketones, cellophanes, or any combination thereof. In one particular example, the polymer film comprises polyethylene terephthalate. The thickness of the film generally may be from about 35 gauge to about 10 mil. In each of various examples, the thickness of the film may be from about 40 to about 80 gauge, from about 45 to about 50 gauge, about 48 gauge, or any other suitable thickness. Other non-conducting substrate materials such as paper and paper laminates, metal oxides, silicates, cellulosics, or any combination thereof, also may be used.

If desired, the polymer film may undergo one or more treatments to modify the surface prior to depositing the microwave energy interactive material onto the polymer film. By way of example, and not limitation, the polymer film may undergo a plasma treatment to modify the roughness of the surface of the polymer film. While not wishing to be bound by theory, it is believed that such surface treatments may provide a more uniform surface for receiving the microwave energy interactive material, which in turn, may increase the heat flux and maximum temperature of the resulting susceptor structure. Such treatments are discussed in U.S. Patent Application Publication No. US 2010/0213192, published Aug. 26, 2010, which is incorporated by reference herein in its entirety.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. For example, the microwave energy interactive material may be provided as a continuous or discontinuous layer or coating including circles, loops, hexagons, islands, squares, rectangles, octagons, and so forth.

If desired, the susceptor may be used in conjunction with other microwave energy interactive elements and/or structures. Structures including multiple susceptor layers are also contemplated.

For example, the construct may include a foil or high optical density evaporated material having a thickness sufficient to reflect a substantial portion of impinging microwave energy. Such elements typically are formed from a conductive, reflective metal or metal alloy, for example, aluminum, copper, or stainless steel, in the form of a solid "patch" generally having a thickness of from about 0.000285 inches to about 0.005 inches, for example, from about 0.0003 inches to about 0.003 inches. Other such elements may have a thickness of from about 0.00035 inches to about 0.002 inches, for example, 0.0016 inches.

In some cases, microwave energy reflecting (or reflective) elements may be used as shielding elements where the food item is prone to scorching or drying out during heating. In other cases, smaller microwave energy reflecting elements may be used to diffuse or lessen the intensity of microwave energy. One example of a material utilizing such microwave energy reflecting elements is commercially available from Graphic Packaging International, Inc. (Marietta, Ga.) under the trade name MicroRite® packaging material. In other examples, a plurality of microwave energy reflecting elements may be arranged to form a microwave energy distributing element (e.g., elements 118, 120) to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy. The breaks or apertures may extend through the entire structure, or only through one or more layers. The number, shape, size, and positioning of such breaks or apertures may vary for a particular application depending on the type of construct being formed, the food item to be heated therein or thereon, the desired degree of heating, browning, and/or crisping, whether direct exposure to microwave energy is needed or desired to attain uniform heating of the food item, the need for regulating the change in temperature of the food item through direct heating, and whether and to what extent there is a need for venting.

By way of illustration, a microwave energy interactive element may include one or more transparent areas to effect dielectric heating of the food item. However, where the microwave energy interactive element comprises a susceptor, such apertures decrease the total microwave energy interactive area, and therefore, decrease the amount of microwave energy interactive material available for heating, browning, and/or crisping the surface of the food item. Thus, the relative amounts of microwave energy interactive areas and microwave energy transparent areas must be balanced to attain the desired overall heating characteristics for the particular food item. In some embodiments, one or more portions of the susceptor may be designed to be microwave energy inactive to ensure that the microwave energy is focused efficiently on the areas to be heated, browned, and/or crisped, rather than being lost to portions of the food item not intended to be browned and/or crisped or to the heating environment. Additionally or alternatively, it may be beneficial to create one or more discontinuities or inactive regions to prevent overheating or charring of the food item and/or the construct including the susceptor. By way of example, the susceptor may incorporate one or more "fuse" elements that limit the propagation of cracks in the susceptor structure, and thereby control overheating, in areas of the susceptor structure where heat transfer to the food is low and the susceptor might tend to become too hot. The size and shape of the fuses may be varied as needed. Examples of susceptors including such fuses are provided, for example, in U.S. Pat. No. 5,412,187, U.S. Pat. No. 5,530,231, U.S. Patent Application Publication No. US 2008/0035634A1, published Feb. 14, 2008, and PCT Application Publication No. WO 2007/127371, published Nov. 8, 2007, each of which is incorporated by reference herein in its entirety.

In the case of a susceptor, any of such discontinuities or apertures may comprise a physical aperture or void (e.g., apertures 110) in one or more layers or materials used to form the structure or construct, or may be a non-physical "aperture". A non-physical aperture is a microwave energy transparent area that allows microwave energy to pass through the structure without an actual void or hole cut through the structure. Such areas may be formed by simply not applying microwave energy interactive material to the particular area, by removing microwave energy interactive material from the particular area, or by mechanically deactivating the particular area (rendering the area electrically discontinuous). Alternatively, the areas may be formed by chemically deactivating the microwave energy interactive material in the particular area, thereby transforming the microwave energy interactive material in the area into a substance that is transparent to microwave energy (i.e., microwave energy inactive). While both physical and non-physical apertures allow the food item to be heated directly by the microwave energy, a physical aperture also provides a venting function to allow steam or other vapors or liquid released from the food item to be carried away from the food item.

The susceptor film 126 (and/or other microwave energy interactive elements) may be joined to a paper or paperboard base layer or support (e.g., support 128) that may impart dimensional stability to the structure. The paper may have a basis weight of from about 15 to about 60 lb/ream (lb/3000 sq. ft.), for example, from about 20 to about 40 lb/ream, for example, about 25 lb/ream. The paperboard may have a basis weight of from about 60 to about 330 lb/ream, for example, from about 80 to about 140 lb/ream. The paperboard generally may have a thickness of from about 6 to about 30 mils, for example, from about 12 to about 28 mils. In one particular example, the paperboard has a thickness of about 14 mils. Any suitable paperboard may be used, for example, a solid bleached sulfate board, for example, Fortress® board, commercially available from International Paper Company, Memphis, Tenn. or solid unbleached sulfate board, such as SUS® board, commercially available from Graphic Packaging International, Marietta, Ga.

The package may be formed according to numerous processes known to those in the art, including using adhesive bonding, thermal bonding, ultrasonic bonding, mechanical stitching, or any other suitable process. Any of the various components used to form the package may be provided as a sheet of material, a roll of material, or a die cut material in the shape of the package to be formed (e.g., a blank).

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

What is claimed is:

1. A microwave heating construct for use in both supporting a food item above a support surface, and heating, browning, and/or crisping the food item, the construct comprising:
    a substantially planar, dimensionally stable platform, the platform including microwave energy interactive material, and the platform having opposite top and bottom surfaces, the top surface being for engaging and supporting the food item; and
    a plurality of venting features, the venting features each including a tab contiguous with an aperture, the tab being defined by a cut extending through the platform, wherein
        the tab is urged downwardly out of the plane of the platform to define the aperture, so that the aperture is substantially unobstructed by the tab and the aperture is open at the top surface of the platform,
        the tab extends downwardly from the bottom surface of the platform for engaging the support surface and at least partially supporting the platform above the support surface to define a void beneath the bottom surface of the platform so that
        the void is in open communication with the aperture,
        the void has a height of less than about 0.4 inches between the support surface and the bottom surface of the platform, and
        the aperture has a major linear dimension of less than about 0.8 inches.

2. The construct of claim 1, wherein at least some venting features of the plurality of venting features are distal from a peripheral edge of the construct.

3. The construct of claim 1, wherein the plurality of venting features includes a centermost venting feature substantially centered on the construct.

4. The construct of claim 1, wherein the plurality of venting features includes a first plurality of venting features arranged in a first ring.

5. The construct of claim 4, wherein the plurality of venting features further includes a second plurality of venting features arranged in a second ring, the second ring being concentric with the first ring.

6. The construct of claim 1, wherein for at least one venting feature, the tab is a first tab of a plurality of tabs of the venting feature.

7. The construct of claim 6, wherein the plurality of tabs of the venting feature comprises four tabs.

8. The construct of claim 1, wherein the tab is substantially triangular in shape.

9. The construct of claim 1, wherein the cut is substantially cross-shaped.

10. The construct of claim 1, wherein
    the cut comprises a first cut and a second cut, the first cut and the second cut each having a midpoint, and
    the first cut and the second cut intersect one another substantially at their respective midpoints.

11. The construct of claim 1, wherein the cut comprises a plurality of cuts that intersect one another along respective midpoints of the plurality of cuts.

12. The construct of claim 1, wherein the cut comprises a slit.

13. The construct of claim 1, wherein the cut comprises a cutout.

14. The construct of claim 1, wherein the microwave energy interactive material comprises a layer of metal operative for converting at least a portion of impinging microwave energy into thermal energy.

15. The construct of claim 1, wherein the microwave energy interactive material comprises a plurality of metallic segments operative for directing microwave energy towards a center of the construct.

16. The construct of claim 1, wherein the microwave energy interactive material comprises a metallic foil patch operative for reflecting microwave energy.

17. The construct of claim 1, wherein none of the construct is positioned below a lower end of the tab while the platform extends horizontally.

18. The construct of claim 1 in combination with the support surface, wherein:
for each venting feature of the plurality of venting features
the downwardly extending tab of the venting feature engages the support surface,
the downwardly extending tab of the venting feature at least partially supports the platform above the support surface to define the void between the bottom surface of the platform and the support surface, and
the aperture of the venting feature is in open communication with the void, and
the aperture of the venting feature has a major linear dimension of less than about 0.8 inches; and
the void has a height of less than about 0.4 inches between the support surface and the bottom surface of the platform.

19. The combination of claim 18, wherein:
for each venting feature of the plurality of venting features, the aperture of the venting feature has a major linear dimension of less than about 0.6 inches; and
the void has a height of less than about 0.3 inches between the support surface and the bottom surface of the platform.

20. The combination of claim 18, wherein:
for each venting feature of the plurality of venting features, the aperture of the venting feature has a major linear dimension of less than about 0.4 inches; and
the void has a height of less than about 0.2 inches between the support surface and the bottom surface of the platform.

21. A method of heating, browning, and/or crisping a food item, comprising:
placing a microwave heating construct upon a support surface so that the microwave heating construct is supported by the support surface, wherein the construct includes
a substantially planar, dimensionally stable platform, the platform including microwave energy interactive material, wherein the microwave energy interactive material is operative for converting at least a portion of impinging microwave energy into thermal energy, and the platform has opposite top and bottom surfaces, and
a plurality of venting features, the venting features each including a tab contiguous with an aperture, the tab being defined by a cut extending through the platform, wherein the tab is urged downwardly out of the plane of the platform to define the aperture so that the aperture is open at the top surface of the platform, and the tab extends downwardly from the bottom surface of platform; and
exposing a food item positioned on the top surface of the platform to microwave energy while the construct is being supported by the support surface, so that a bottom surface of the food item is at least partially browned and/or crisped, wherein the construct being supported by the support surface comprises the downwardly extending tabs of the venting features engaging the support surface and at least partially supporting the platform above the support surface so that
a void is defined beneath the bottom surface of the platform, between the support surface and the bottom surface of the platform during the exposing of the food item on the microwave heating construct to the microwave energy, and
the void is in communication with the apertures of the venting features during the exposing of the food item on the microwave heating construct to the microwave energy.

22. The method of claim 21, wherein the microwave energy interactive material converts at least a portion of the microwave energy into thermal energy to at least partially brown and/or crisp the bottom surface of the food item.

23. The method of claim 22, wherein as the food item releases moisture, the moisture is carried away from the food item through the aperture and, optionally, the void.

24. The method of claim 21, wherein:
for each venting feature of the plurality of venting features, the aperture of the venting feature has a major linear dimension of less than about 0.8 inches; and
the void has a height of less than about 0.4 inches between the support surface and the bottom surface of the platform.

25. The method of claim 24 wherein:
for each venting feature of the plurality of venting features, the aperture of the venting feature has a major linear dimension of less than about 0.4 inches; and
the void has a height of less than about 0.2 inches between the support surface and the bottom surface of the platform.

* * * * *